US009983896B1

(12) United States Patent
Naik et al.

(10) Patent No.: US 9,983,896 B1
(45) Date of Patent: May 29, 2018

(54) LUN WITH ZERO STORAGE AS A PROTOCOL ENDPOINT

(71) Applicant: EMC IP Holding Company LLC, Hopkinton, MA (US)

(72) Inventors: Dilesh Naik, Shrewsbury, MA (US); Shuyu Lee, Acton, MA (US); Jean Schiff, Bolton, MA (US); David W. Harvey, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 124 days.

(21) Appl. No.: 14/985,960

(22) Filed: Dec. 31, 2015

(51) Int. Cl.
*G06F 9/455* (2018.01)
*G06F 3/06* (2006.01)

(52) U.S. Cl.
CPC ........ *G06F 9/45558* (2013.01); *G06F 3/0608* (2013.01); *G06F 3/0664* (2013.01); *G06F 3/0683* (2013.01); *G06F 2009/45583* (2013.01)

(58) Field of Classification Search
None
See application file for complete search history.

(56) References Cited

U.S. PATENT DOCUMENTS

| 9,003,129 | B1 | 4/2015 | Harvey et al. |
| 9,152,550 | B1 | 10/2015 | Taylor et al. |
| 2007/0176807 | A1* | 8/2007 | Mattes ............. G01R 31/31917 341/118 |
| 2013/0054890 | A1 | 2/2013 | Desai et al. |

OTHER PUBLICATIONS

Shuyu Lee, et al.; "Protocol Endpoint Object Duality"; U.S. Appl. No. 14/986,066, filed Dec. 31, 2015.

* cited by examiner

*Primary Examiner* — Emerson Puente
*Assistant Examiner* — Steven Do
(74) *Attorney, Agent, or Firm* — BainwoodHuang

(57) ABSTRACT

A method includes (a) receiving a setup command directing a computing device to create a protocol endpoint to allow a remote host device to access storage volumes of the computing device presented to the remote host through the protocol endpoint as virtual storage volumes, (b) in response to receiving the setup command, creating a logical storage device object representing the protocol endpoint, the logical storage device object having zero underlying storage capacity, (c) subsequent to creating the logical storage device object, receiving a command directed at the protocol endpoint, and (d) in response to receiving the command, processing the command by a driver stack on the computing device containing the logical storage device object representing the protocol endpoint, the driver stack being shorter than another driver stack on the computing device used to process storage commands directed at another logical storage device object having non-zero underlying storage.

16 Claims, 5 Drawing Sheets

US 9,983,896 B1

LUN WITH ZERO STORAGE AS A PROTOCOL ENDPOINT

RELATED APPLICATIONS

This application may be considered to be related to co-pending application Ser. No. 14/986,066 entitled "PROTOCOL ENDPOINT OBJECT DUALITY" filed on even date herewith, the entire content and teaching of which is incorporated herein by this reference.

BACKGROUND

Virtual machines (VMs) are used to allow several logical computers to run on a single computing device. VMs conveniently may also be created on-the-fly as needed. Typically, a VM makes use of several different disk volumes, including, for example, a configuration volume, a data volume, a swap volume, etc. In some systems (e.g., VMWare), each VM has at least four volumes, and each volume may have up to 32 snapshots (presenting a view of the data on that volume at a particular moment in time). Thus, each VM may be associated with 128 or more volumes. If a system runs 1,000 VMs, for example, there may be on the order of 128,000 volumes, which is more than a typical data storage system is capable of presenting at once, even if the system is internally capable of managing that many logical drives.

A virtual logical volume (e.g., a VMWare VVol) is a logical volume that is managed by a data storage system but presented to an external host via a protocol endpoint (PE). A PE functions as a single SCSI target but presents many internal logical volumes to an external host.

SUMMARY

There are several ways to implement a PE on a data storage system, but, unfortunately, several of these suffer from deficiencies. One way to implement a PE is by implementing it as a traditional volume. However, since a traditional volume has underlying storage, if that underlying storage becomes unavailable (e.g., through a fault of the RAID group), the PE would cease to function properly, even while some of the VVols that it presents may be backed by unfaulted storage. Instead it would be possible to implement a PE as an entirely new object rather than as a volume subject to the same rules as a traditional volume. However, doing so would require writing a lot of new code to implement a new data structure. In particular, many features implemented in drivers within the storage driver stack, such as redirection between parallel storage processors, would have to be re-implemented in the context of a new data structure.

Thus, it would be desirable to utilize features already implemented within the storage driver stack but without having the PE be susceptible to being faulted by faulty underlying storage. This result may be accomplished by implementing the PE as a logical volume having no underlying storage. Since the PE has no underlying storage, there is no RAID group that could possibly fault the PE. In addition, since the PE is still implemented as a logical volume, it can utilize features from within the storage driver stack. However, since a logical volume cannot normally have zero underlying storage, the driver stack is cut short prior to the lowest levels, so the drivers that deal with the underlying storage are never accessed, instead being emulated by a loop-back mechanism.

In one embodiment, a computer-implemented method performed by a computing device is disclosed. The method includes (a) receiving a setup command directing the computing device to create a protocol endpoint on the computing device to allow a remote host device to access storage volumes of the computing device presented to the remote host through the protocol endpoint as virtual storage volumes, (b) in response to receiving the setup command, creating a logical storage device object representing the protocol endpoint, the logical storage device object having zero underlying storage capacity, (c) subsequent to creating the logical storage device object, receiving a management command directed at the protocol endpoint, and (d) in response to receiving the command, processing the command by a driver stack on the computing device containing the logical storage device object representing the protocol endpoint, the driver stack being shorter than another driver stack on the computing device used to process storage commands directed at another logical storage device object having non-zero underlying storage. An apparatus and computer program product for performing a similar method are also provided.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

DETAILED DESCRIPTION

Embodiments are directed to implementing the PE as a logical volume having no underlying storage. Since the PE has no underlying storage, a faulted RAID group cannot fault the PE. In addition, since the PE is still implemented as a logical volume, it can utilize features from within the storage driver stack. However, since a logical volume cannot normally have zero underlying storage, the driver stack is cut short prior to the lowest levels, so the drivers that deal with the underlying storage are never accessed, instead being emulated by a loop-back mechanism.

Figure 1:
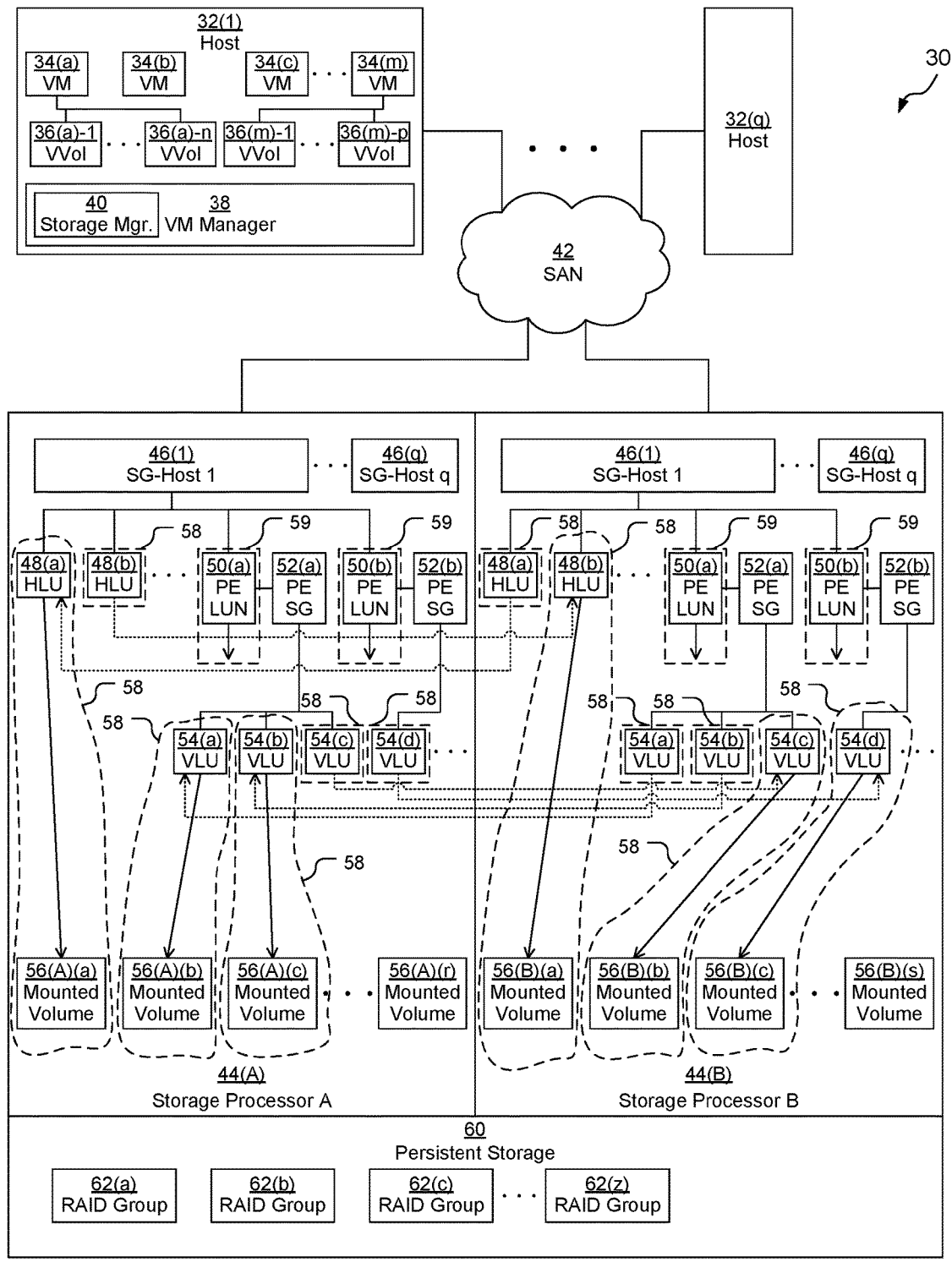
FIG. 1 is a block diagram depicting an example system and apparatus for use in connection with various embodiments.

FIG. 1 depicts a data storage system 30 connected to one or more hosts 32 (depicted as hosts 32(a), . . . , 32(q)) over a network, such as storage area network (SAN) 42. Data storage system 30 is a computing device, made up of persistent storage 60 and two storage processors (SPs) 44 (depicted as SPs 44(A), 44(B)), although this is by way of example only; other types of computing devices are also possible. For example, although two SPs 44(A), 44(B) are depicted, in some embodiments, there may be only a single SP 44 or there may be more than two.

A host 32 may be any kind of computing device configured to operate on a network, such as, for example, personal computers, workstations, server computers, enterprise servers, laptop computers, tablet computers, smart phones, mobile computers, etc. or combinations thereof. Typically, a host 32 is a server computer or an enterprise server. Host 32(a) represents an example typical host 32. Host 32(a) runs a virtual machine (VM) management application 38, which manages a plurality of VMs 34 (depicted as VMs 34(a), 34(b), 34(c), . . . , 34(m)) executing on one or more processors (not depicted) of the host 32(a). VM management application 38 may include a hypervisor, as is well-known in the art. Each VM 34 may be associated with one or more virtual storage volumes such as VVols 36. As depicted, VM 34(a) is able to access VVols 36(a)-1, . . . , 36(a)-n, while VM 34(m) is able to access VVols 36(m)-1, . . . , 36(m)-p. These VVols 36 are not actually present on host 32(a), being logical abstractions of storage volumes presented by data storage system 30, made to appear to the VMs 34 like actual disks by storage manager 40 of the VM management application 38.

Persistent storage 60 may include one or more of any kind of storage device (not depicted) able to persistently store data, such as, for example, a magnetic hard disk drive, a solid state storage device (SSD), etc. As depicted, persistent storage 60 is arranged as a plurality of RAID groups 62 (depicted as RAID groups 62(a), 62(b), 62(c), . . . , 62(z)). Each RAID group 62 is made up of one or more storage devices, which may logically combine to create a logical disk having larger size or redundancy features or both, depending on the RAID level, as is well-known in the art. Each RAID group 62 may be partitioned into one or more volumes. In some embodiments (not depicted), instead of being partitioned directly into volumes, each RAID group 62 may be partitioned into a plurality of slices (e.g., 256 megabytes or 1 gigabyte in size). Slices from one or more RAID groups 62 may be logically combined to create volumes.

SP 44(A) represents an example typical SP 44. SP 44(A) has one or more host storage groups (SGs) 46 (depicted as host SGs 46(1), . . . , 46(q)). A host SG 46 organizes a set of host-visible logical units (HLUs) 48 (depicted as HLUs 48(a), 48(b), . . . ) and protocol endpoint logical units (PE LUNs) 50 (typically two, such as PE LUNs 50(a) and 50(b) as depicted) which are visible to a particular host 32. Typically, a given host 32 has only one associated host SG 46 per SP 44. Thus, for example, as depicted, host SG 46(1) organizes HLUs 48(a), 48(b) and PE LUNs 50(a), 50(b), which are visible to host 32(1). Host SG 46(q) organizes HLUs 48 and PE LUNs 50 that are visible to host 32(q), although the particular HLUs 48 and PE LUNs 50 organized by host SG 46(q) are not depicted.

An HLU 48 is a logical volume or disk that is made visible to an external host 32. Each HLU 48 has underlying storage via a mounted volume 56 (depicted as mounted volumes 56(A)(a), 56(A)(b), 56(A)(c), . . . , 56(A)(r) on SP 44(A) and mounted volumes 56(B)(a), 56(B)(b), 56(B)(c), . . . , 56(B)(s) on SP 44(B), with arrows pointing from each HLU 48 to the mounted volume 56 that underlies it), each of which has its underlying storage drawn from a RAID group 62 of persistent storage 60, allowing data to be stored there. An HLU 48 is typically visible to any kind of host 32 on the SAN 42 regardless of whether that host 32 is running a VM management application 38 (and storage manager 40), although placement in a host SG 46 will limit which particular hosts 32 may access that HLU 48. An HLU 48, therefore, is typically used for non-VM storage as well as for storage for VMs 34. Thus, as depicted, HLU 48(a) is a data object visible to host 32(1) that represents mounted volume 56(A)(a). The relationship between HLU 48(a) and mounted volume 56(A)(a) is defined by a storage driver stack 58, which contains those data objects, allowing them to be operated on by various drivers. Storage driver stack 58 and its associated drivers are described in further detail below, in connection with FIG. 2.

HLU 48(b) is a data object visible to host 32(1) that represents mounted volume 56(B)(a), which is mounted on SP 44(B). Since the mounted volume 56(B)(a) underlying HLU 48(b) is not mounted on SP 44(A), if host 32(1) attempts to access HLU 48(b) through SP 44(A), SP 44(A) redirects or otherwise routes the access through SP 44(B). Thus, within its storage driver stack 58 is a mechanism for redirecting commands directed at HLU 48(b) on SP 44(A) to the corresponding HLU 48(b) on SP 44(B) (depicted by the dotted arrowed line between these objects). This is a result of the Active-Passive configuration of data storage system 30. Thus, any given mounted volume 56 is only mounted on one SP 44, but a host 32 may be able to access that mounted volume 56 via an exposed HLU 48 on either SP, either via the preferred path through the SP 44 on which the mounted volume 56 is mounted or via a non-preferred path going through two SPs 44. Although the dotted arrowed line is only depicted as pointing from HLU 48(b) on SP 44(A) to HLU 48(b) on SP 44(B), in fact, there may also be some redirection in the other direction. Thus, for example, if a configuration change is made to HLU 48(b) on SP 44(B), that change is mirrored to the HLU 48(b) on SP 44(A).

A PE LUN 50 is also a logical volume that is made visible to an external host 32 running a VM management application 38 as a SCSI target. However, unlike a traditional logical volume (e.g., an HLU 48), a PE LUN 50 has zero underlying storage on persistent storage 60. This lack of underlying storage is depicted by the arrow to nowhere protruding from each PE LUN 50, since there is no mounted volume 56 providing underlying storage for a PE LUN 50. PE LUNs 50 are each managed by a respective storage driver stack 59, which operates on those data objects. Storage driver stack 59 is described in further detail below, in connection with FIG. 2.

A PE LUN 50 is a data object visible to a host 32 that presents virtual logical units (VLUs) 54 (depicted as VLUs 54(a), 54(b), 54(c), 54(d), . . . ) to the host 32 as VVols 36. VLUs 54 are not exactly "virtual," except insofar as they are typically used by virtual machines 34. PE LUN 50(a) on SP 44(A) is a data object visible to host 32(1) that represents a preferred path to VLUs 54(a), 54(b), 54(c) via SP 44(A). PE LUN 50(a) on SP 44(B) is a corresponding data object visible to host 32(1) that represents a non-preferred path to VLUs 54(a), 54(b), 54(c) via SP 44(B). Because the preferred path for PE LUN 50(a) is on SP 44(A), VLUs 54(a) and 54(b) are data objects with underlying storage provided by mounted volumes 56(A)(b) and 56(A)(c), respectively, both mounted on SP 44(A). As depicted, VLU 54(c) no longer has its underlying mounted volume 56(B)(b) mounted on SP 44(A), although this is an unusual configuration, albeit possible.

PE LUN 50(b) on SP 44(A) is a data object visible to host 32(1) that represents a non-preferred path to VLU 54(d). PE LUN 50(b) on SP 44(B) is a corresponding data object visible to host 32(1) that represents the preferred path to VLU 54(d) via SP 44(B). Because the preferred path for PE LUN 50(b) is on SP 44(B), VLU 54(d) is a data object with underlying storage provided by mounted volume 56(B)(c) mounted on SP 44(B). Typically, there are two PE LUNs 50(a), 50(b) on each SP 44 for a given host SG 46—one representing a preferred path for that SP 44 and one representing a non-preferred path for that SP 44.

The relationship between a VLU 54 and a respective mounted volume 56 is defined by a storage driver stack 58, which contains those data objects, allowing them to be operated on by various drivers.

In some embodiments, in order to organize the VLUs 54 presented by a particular PE, a PE SG 52 is used in conjunction with the PE LUN 50. A given PE LUN 50 has only one associated PE SG 52. Thus, as depicted, PE LUN 50(*a*) has corresponding PE SG 52(*a*). PE SG 52(*a*) organizes the set of VLUs 54(*a*), 54(*b*), 54(*c*) which are visible to a host 32(1) via a first PE. Similarly, as depicted, PE LUN 50(*b*) has corresponding PE SG 52(*b*). PE SG 52(*b*) organizes the set of VLUs including 54(*d*) which are visible to a host 32(1) via a second PE.

Figure 2:
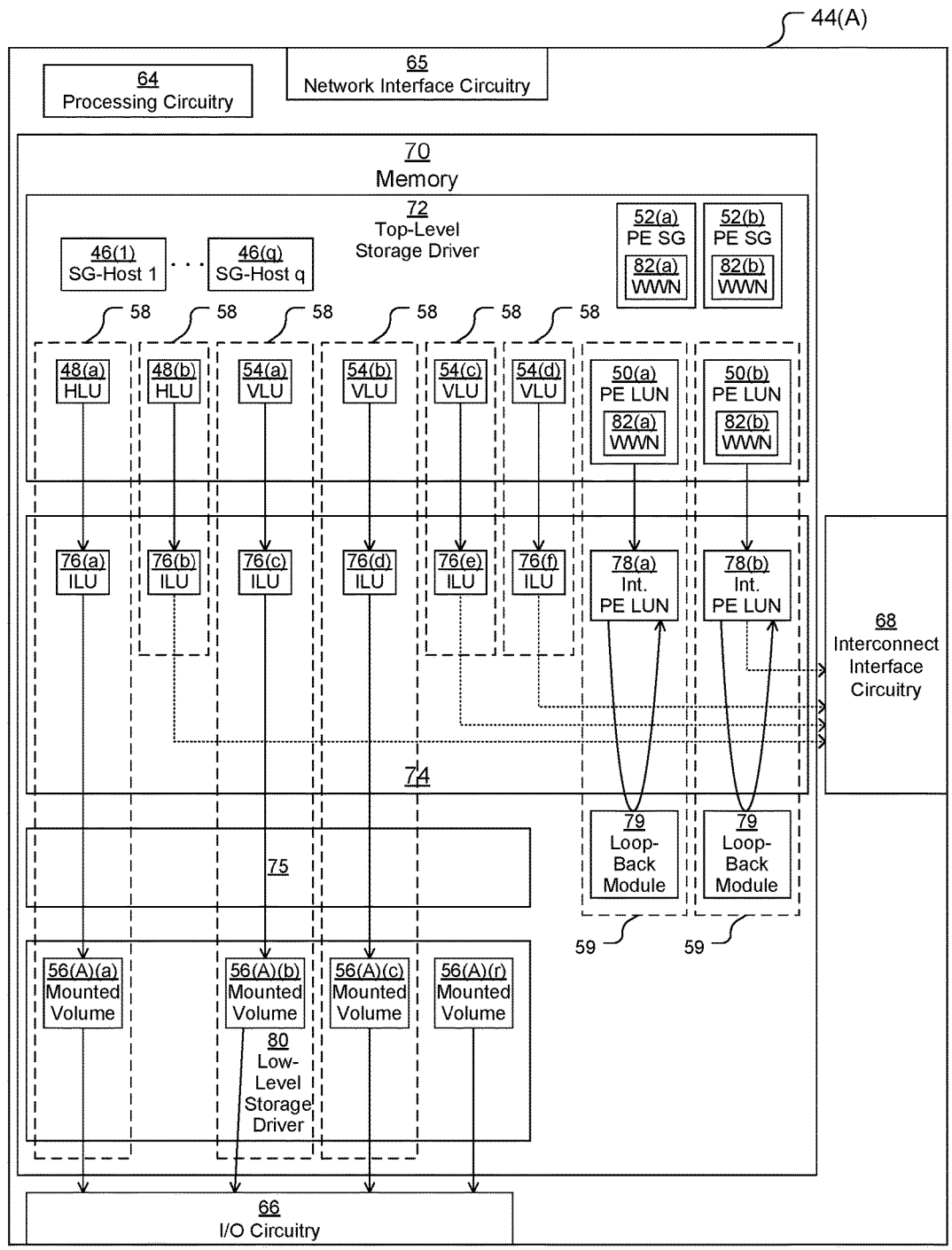
FIG. 2 is a block diagram depicting an example apparatus for use in connection with various embodiments.

FIG. 2 depicts a different view of an example SP 44(A), with more attention paid to the hardware. Storage processor 44(A) includes processing circuitry 64, network interface circuitry 65, input/output (I/O) circuitry 66, SP interconnect interface circuitry 68, and memory 70. In a typical arrangement, storage processor 44(A) is configured as a board or enclosure mounted within a rack connected to persistent storage 60 also mounted within the rack. These components, in combination, may make up data storage system 30.

Processing circuitry 64 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Network interface circuitry 65 may include one or more Ethernet cards, cellular modems, Fibre Channel (FC) adapters, Wireless Fidelity (Wi-Fi) wireless networking adapters, and other devices for connecting to a network, such as a SAN 42, local area network (LAN), wide area network (WAN), cellular data network, etc. Network interface circuitry 65 is able to communicate with hosts 32. In operation, VMs 34 running on host 32(1) send data storage commands to storage processor 44(A) in order to read from and write to persistent storage 60. VMs 34 may directly access HLUs 48 within the host SG 46(1) for that host 32(1). For a VM 34(*a*) to access one of its associated VVols 36(*a*)-1, it sends a storage command to storage manager 40 of the VM management application 38, which picks an appropriate path (preferably an optimized path, which, in this case, is through SP 44(A)) and forwards the storage command to the SP 44(A).

I/O circuitry 66 is configured to connect to a storage interconnect bus (e.g., via a backplane) to enable communication with disks of persistent storage 60. The storage interconnect bus may include one or more of a Fiber Channel, SCSI, Serial Attached SCSI, ATA, Serial ATA, or other similar storage buses for communicating with storage.

SP interconnect interface circuitry 68 is configured to connect to a high-speed inter-processor bus (not depicted), which allows the SPs 44 to communicate with each other directly.

Memory 70 may be any kind of digital system memory, such as, for example, random access memory (RAM). Memory 70 stores one or more operating systems in operation (not depicted, e.g., Linux, UNIX, Windows, MacOS, or a similar operating system), various applications executing on processing circuitry 64 as well as data used by those applications.

As depicted, memory 70 includes several storage drivers including a top-level storage driver (TLD) 72, a redirector driver 74, and a low-level storage driver 80. In some embodiments, one or more of these drivers 72, 74, 80 may have its functionality distributed across several other drivers in addition to those depicted.

TLD 72 is responsible for presenting volumes outside the data storage system 30. Thus, TLD 72 maintains objects representing volumes that are accessible by hosts 32, including HLUs 48, VLUs 54, and PE LUNs 50. In addition, TLD 52 maintains storage groups including host SGs 46 and PE SGs 52.

In some embodiments, when a host 32(*x*) attempts to access a volume on SP 44(A), it addresses a command to a target address. The target address is several bytes in length. In some embodiments, the first t bits (e.g., 16 bits or two bytes) of the target address are used to index into a particular HLU 48 or PE LUN 50 within the host SG 46(*x*) for that host 32(*x*). In some of these embodiments, several bits within the two-byte portion are reserved. For example, there may be 14 bits available for indexing, allowing up to $2^{14}$ or 16,384 HLUs 48 and PE LUNs 50 within a host SG 46. Typically, no more than two PE LUNs 50 are allowed, representing an optimized and a non-optimized path (although, in some embodiments, there could conceivably be more PE LUNs 50).

If a PE LUN 50 is addressed, TLD 72 is tasked with ascertaining whether the host 32 is attempting to access the PE itself or a VLU 54 presented by the PE. In some embodiments, a u-bit next portion of the target address (e.g., u is 8 bits, so the third byte) may encode a signal indicating whether the PE itself is being addressed or whether a VLU 54 is being addressed. In one embodiment, if the third byte of the target address is zero, the PE itself is being addressed, while if the third byte of the target address has a specific non-zero code (e.g., 11100010), a VLU 54 is being addressed. Any other value for the third byte would be invalid, indicating an error. If the TLD 72 determines that a VLU 54 is being addressed, TLD 72 proceeds to read the remainder of the target address. In one embodiment, the target address is 8 bytes in length, leaving the remaining 5 bytes or 40 bits for indexing particular VLUs 54, although this is by way of example only. In some embodiments, target address may have a different length, leaving a different number of bits available for indexing VLUs 54. 40 bits allows a theoretical maximum of about 1 trillion VLUs 54 to be indexed per PE, although a typical system will have far fewer than that.

Once TLD 72 determines the index of a particular VLU 54 being addressed by the target address, TLD 72 may make reference to the PE SG 52(*x*) for the given PE in order to find the particular VLU 54 object in memory. In one embodiment, this is easily accomplished by indexing PE LUNs 50 and PE SGs 52 using common indices. Thus, the PE LUN 50(*a*) is indexed by a first unique World Wide Name (WWN) 82(*a*), and its corresponding PE SG 52(*a*) is also indexed by the same first unique WWN 82(*a*). Similarly, the PE LUN 50(*b*) is indexed by a second unique WWN 82(*b*), and its corresponding PE SG 52(*b*) is also indexed by the same second unique WWN 82(*b*).

Although TLD 72 manages HLUs 48, VLUs 54, and PE LUNs 50, each HLU 48 and VLU 54 is managed by a respective standard storage driver stack 58, while each PE LUN 52 is managed by a respective shortened storage driver stack 59. A standard storage driver stack 58 has TLD 72 at the top with redirector driver 74 in the middle of the stack 58 and low-level storage driver 80 at the bottom of the stack 58. In some embodiments, a standard storage driver stack 58 also contains one or more additional drivers 75 in between the redirector driver 74 and the low-level storage driver 80.

In some embodiments (not depicted), there may also be additional drivers in a standard storage driver stack 58 below the low-level storage driver 80.

However, a shortened driver stack 59 has TLD 72 at the top with redirector driver 74 below it, but omitting the low-level storage driver 80. Instead, within shortened driver stack 59 there is a loop-back module 79 that replaces the low-level storage driver 80 and possibly the additional drivers 75, but always returning a successful response. For example, if a SCSI command requesting the size of the LUN is sent to a PE LUN 50, the command will propagate down the stack to the loop-back module 79, which will return a size of zero.

Redirector driver 74 is responsible for maintaining the active-passive configuration of the data storage system 30. Redirector driver 74 manages intermediate logical units 76, which are data objects that may represent either HLUs 48 or VLUs 54, however, at this level of the driver stack 58, that distinction is not relevant. Some ILUs 76 (e.g., ILUs 76(a), 76(c), and 76(d), as depicted) point to mounted volumes 56 mounted on the SP 44(A) (e.g., mounted volumes 56(A)(a), 56(A)(b), and 56(A)(c), respectively), while other ILUs 76 (e.g., ILUs 76(b), 76(e), and 76(f), as depicted) are redirected to the other SP 44 (B) via interconnect interface circuitry 68. In addition, although not depicted, redirector driver 74 also is responsible for providing redirection services in the opposite direction, receiving redirection to ILUs 76(a), 76(c), and 76(d) from corresponding redirector driver 74 on SP 44(B). Redirector driver 74 forwards any commands (aside from commands involving redirection management) directed at ILUs 76 to either the next level of the driver stack 58 or to the peer SP 44(B) based on the redirection for that particular ILU 76.

Redirector driver 74 also manages intermediate PE LUNs 78, which are data objects that represent PE LUNs 50 but at the redirection level. An intermediate PE LUN 78 (e.g., intermediate PE LUN 78(b)) may redirect to a corresponding intermediate PE LUN 78(b) on peer SP 44(B) via interconnect interface circuitry 68. In addition, although not depicted, redirector driver 74 also is responsible for providing redirection services in the opposite direction, receiving redirection to intermediate PE LUN 78(a) from corresponding redirector driver 74 on SP 44(B). Thus far, the management of intermediate PE LUNs 78 by redirector driver 74 is the same as for ILUs 76. However, instead of forwarding any received commands (aside from commands involving redirection management) directed at intermediate PE LUNs 78 to the next level of the driver stack 58, redirector driver 74 forwards commands directed to PE LUNs 78 that are not redirected (e.g., for PE LUN 78(a)) to loop-back module 79 of the shortened driver stack 59. In addition, the redirection at this level allows configuration information regarding the PE to be shared between the SPs 44.

Finally, low-level storage driver 80 is responsible for managing mounted volumes 56 that are mounted on the SP 44(A), mapping these mounted volumes 56 to specific RAID groups 62 (and partitions of slices thereof) on persistent storage 60. Low-level storage driver 80 may communicate directly with I/O circuitry 66 to send I/O commands to persistent storage 60.

In some embodiments, memory 70 may also include a persistent storage portion (not depicted). Persistent storage portion of memory 70 may be made up of one or more persistent storage devices, such as, for example, hard disk drives, solid-state storage devices, flash drives, etc. Persistent storage of memory 70 is configured to store programs and data even while the storage processor 44(A) is powered off. The OS (e.g., Linux, UNIX, Windows, or a similar operating system) and the applications (e.g., drivers 72, 74, 80) are typically stored in persistent storage (either persistent storage of memory 70 or persistent storage 60) so that they may be loaded into memory 70 from persistent storage upon a system restart. These applications, when stored in non-transient form either in the volatile portion of memory 70 or in persistent storage, form a computer program product. The processing circuitry 64 running one or more of these applications thus forms a specialized circuit constructed and arranged to carry out the various processes described herein.

Figure 3:
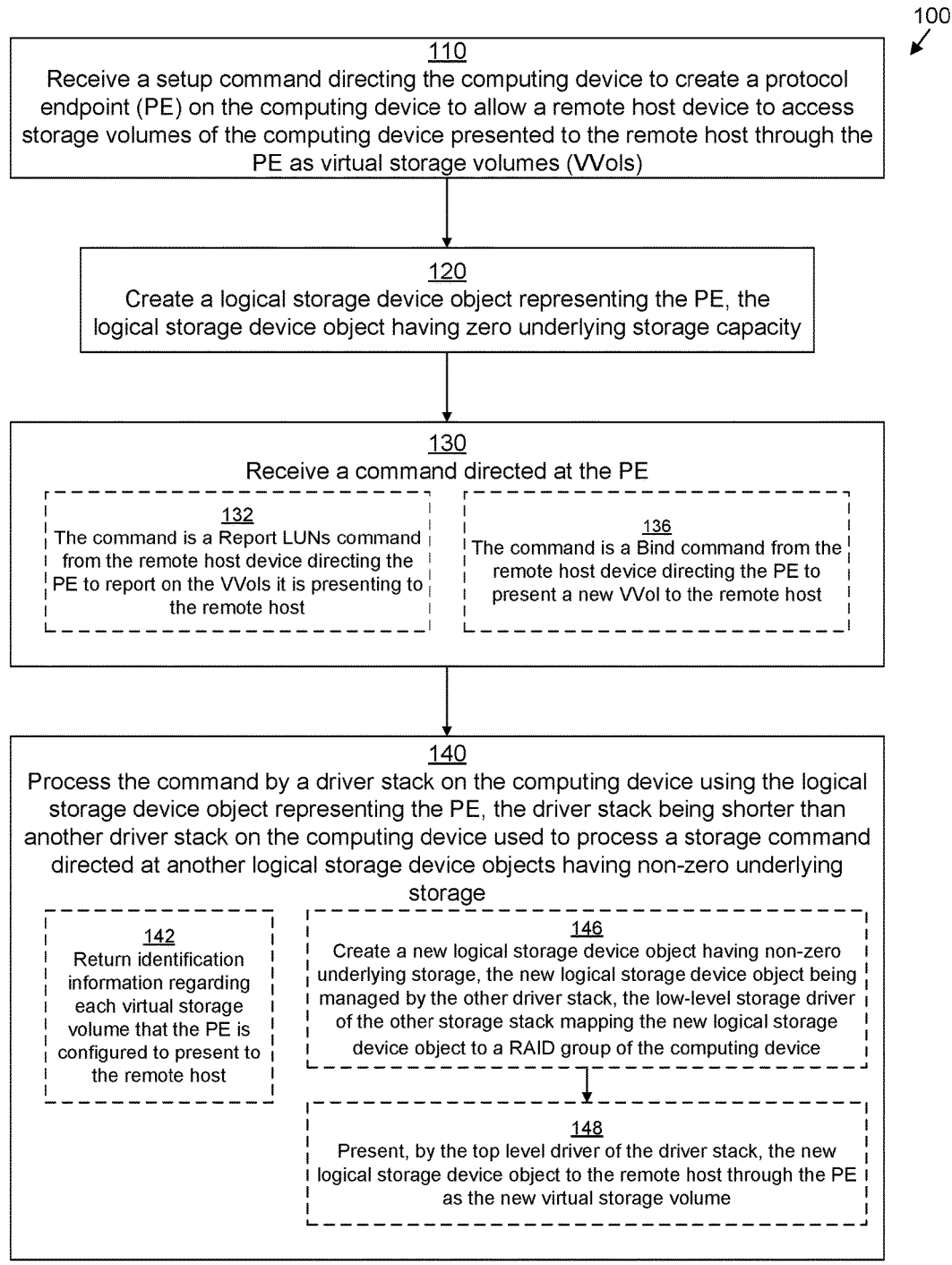
FIG. 3 is a flowchart depicting an example method for use in conjunction with various embodiments.

FIG. 3 illustrates an example method 100 performed by data storage system 30. It should be understood that any time a piece of software (e.g., driver 72, 74, 80, etc.) is described as performing a method, process, step, or function, in actuality what is meant is that a computing device (e.g., data storage system 30 or its component storage processor 44; host 32, etc.) on which that piece of software is running performs the method, process, step, or function when executing that piece of software on its processing circuitry 64.

It should be understood that, within FIG. 3, various sub-steps are dashed because they may be optional and not fundamental to method 100. However, it should be understood that, in some embodiments, one or more of the other steps or sub-steps may also be omitted. Similarly, in some embodiments, one or more steps or sub-steps may be combined together or performed in a different order.

Method 100 is performed by data storage system 30, typically by only one or the other of storage processors 44(A), 44(B). For ease of description, method 100 will be described in the context of performance on SP 44(A) in communication with a particular host 32(1). Method 100 may typically be performed by both SPs 44 separately. In addition, method 100 may be logically divided into two segments. Steps 110-120 involve setting up a PE on an SP 44 and are typically performed only once per PE per SP 44. Steps 130 and 140 involve processing commands directed at PE once that PE has been set up. These steps 130, 140 may be performed many times once the PE has been set up.

In step 110, SP 44(A) receives a setup command directing the SP 44(A) to create a PE on the system 30 to allow a remote host 32(1) to access storage volumes (e.g., VLUs 54 representing respective underlying mounted volumes 56) of the SP 44(A) presented to the remote host 32(1) through the PE as VVols 36.

In response, in step 120, SP 44(A) creates a logical storage device object (PE LUN 50) representing the PE, the logical storage device object having zero underlying storage capacity. This is done by creating the PE LUN 50 with a shortened driver stack 59 rather than a standard storage driver stack 58. Additional configuration of the PE may be performed at this time as well, such as setting up the PE SG 52, etc.

Subsequently, in step 130, SP 44(A) receives a command (e.g., an in-band SCSI command) directed at the PE LUN 50. Various types of commands may be issued, but specific attention is given to two specific cases. In one case, in sub-step 132, the received command is a Report LUNs command from the remote host 32(1) directing the PE to report on the VLUs 54 it is presenting to the remote host 32(1) as VVols 36. In another case, in sub-step 136, the received command is a Bind command from the remote host 32(1) directing the PE to present a new VLU 54 to the remote host 32(1) as a VVol 36.

It should be understood that a Bind command can also be issued out-of-band of the SCSI path, however, that case is not discussed here.

Other possible commands that could be directed at the PE LUN 50 in step 130, but not specifically depicted, include a Reset command and a Trespass command, for example.

In response, in step 140, SP 44(A) processes the command by a driver stack (i.e., shortened driver stack 59) on the SP 44(A) containing the PE LUN 50, the driver stack 59 being shorter than another driver stack 58 on the SP 44(A) used to process storage commands directed at another logical storage device object (e.g., an HLU 48 or VLU 54) having non-zero underlying storage.

In one case, in sub-step 142, performed when sub-step 132 is done, in response to the received report management command, SP 44(A) returns identification information regarding each VLU 54 that the PE is configured to present to the remote host 32(1). This is performed within the TLD 72, typically with reference to the PE SG 52 associated with the PE.

In another case, in sub-step 146, performed when sub-step 136 is done, in response to the received add VVol management command, SP 44(A) creates a new logical storage device object (VLU 54) having non-zero underlying storage, the new VLU 54 being managed by a standard storage driver stack 58, the low-level storage driver 80 of the other storage stack 58 mapping the new VLU 54 to a RAID group 62 of the persistent storage 60. Then, in sub-step 148, TLD 72 presents the new VLU 54 to the remote host 32(1) through the PE as the newly-requested VVol 36.

Figure 4:
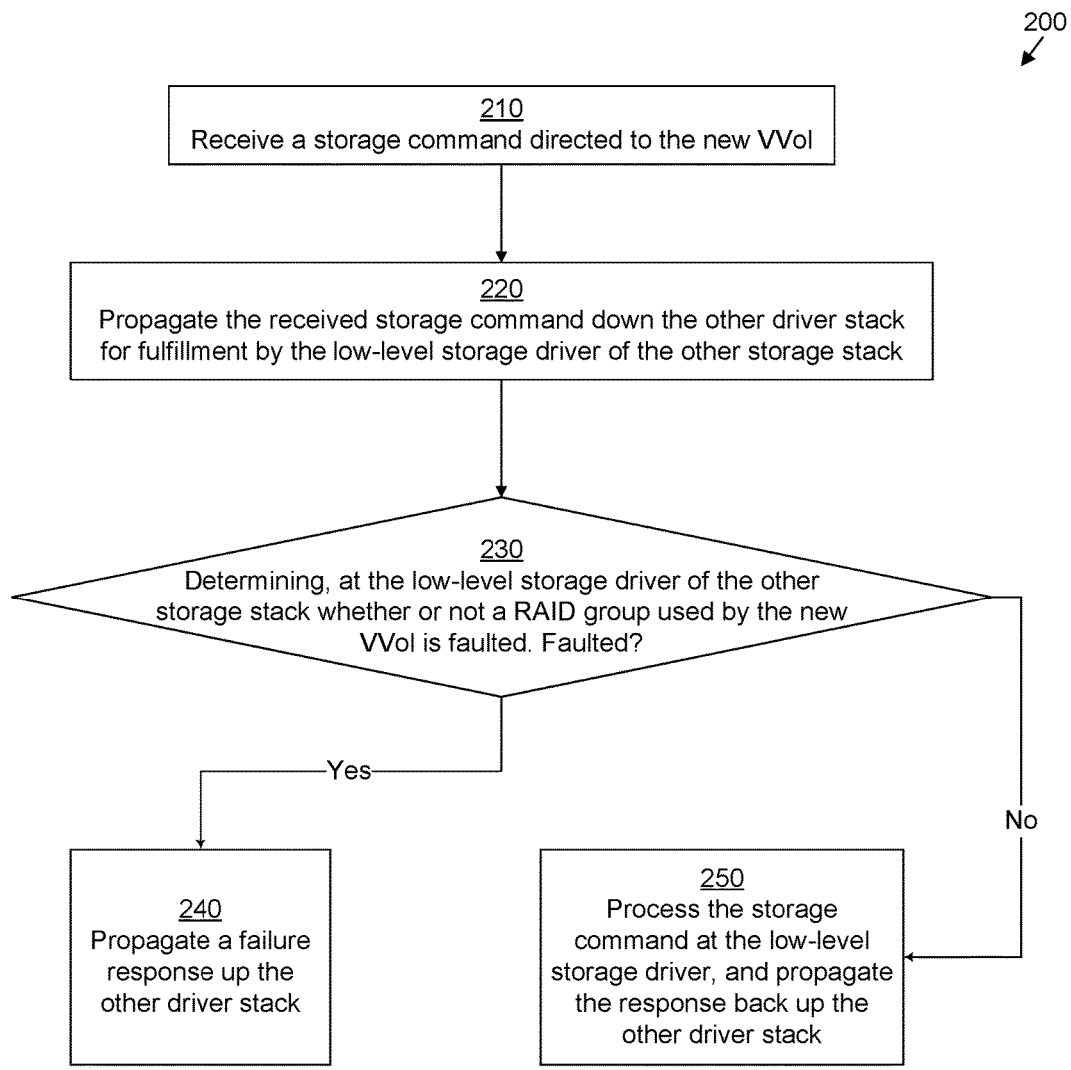
FIG. 4 is a flowchart depicting an example method for use in conjunction with various embodiments.

FIG. 4 depicts a method 200, performed by an SP 44 (e.g., SP 44(A)) for fulfilling a storage command directed at a VVol 36 that has already been added to a PE (thus, method 200 occurs after method 100, and particularly after the version involving sub-steps 136, 146, and 148 has been performed).

In step 210, TLD 72 receives a storage command (e.g., a SCSI command) directed to a VVol 36. TLD 72 may make reference to the target address of this command and the PE SG 52(a) (or, in some embodiments, a structure created with reference to the PE SG 52(a)) to determine which VLU 54 it is addressed to.

In step 220, TLD 72 propagates the received storage command down the standard storage stack 58 for fulfillment by the low-level storage driver 80 of the standard storage stack 58.

Thus, for example, if the storage command is directed to VLU 54(a), it would propagate down the storage stack 58 to redirector driver 74 (operating on ILU 76(c)). Since ILU 76(c) is not redirected, it would further propagate down the storage stack 58 to low-level storage driver 80 (operating on mounted volume 56(A)(b)).

As another example, if the storage command is directed to VLU 54(d), it would propagate down the storage stack 58 to redirector driver 74 (operating on ILU 76(f)). Since ILU 76(f) is redirected, however, it would redirect the storage command to corresponding ILU 76(f) at redirector driver 74 of peer SP 44(B), which would then further propagate down a standard storage driver stack 58 of SP 44(B) to low-level storage driver 80 of SP 44(B) (operating on mounted volume 56(B)(c)).

In step 230, low-level storage driver 80 determines whether or not a RAID group 62 used by the VLU 54 is faulted. If there is a fault, then the storage command will fail, so operation proceeds with step 240 in which low-level storage driver 80 sends a failure response back up the storage stack 58, which will propagate up to the TLD 72, which is able to send a failure response back to the remote host 32(1).

If there is not a fault, then operation proceeds with step 250 in which the low-level storage driver 80 processes the storage command as usual (e.g., reading from or writing to the mounted volume 56 that it is operating on) and sends the result (e.g., the read data or a confirmation or failure of writing) back up the storage stack 58, which will propagate up to the TLD 72, which is able to send the response back to the remote host 32(1).

Figure 5:
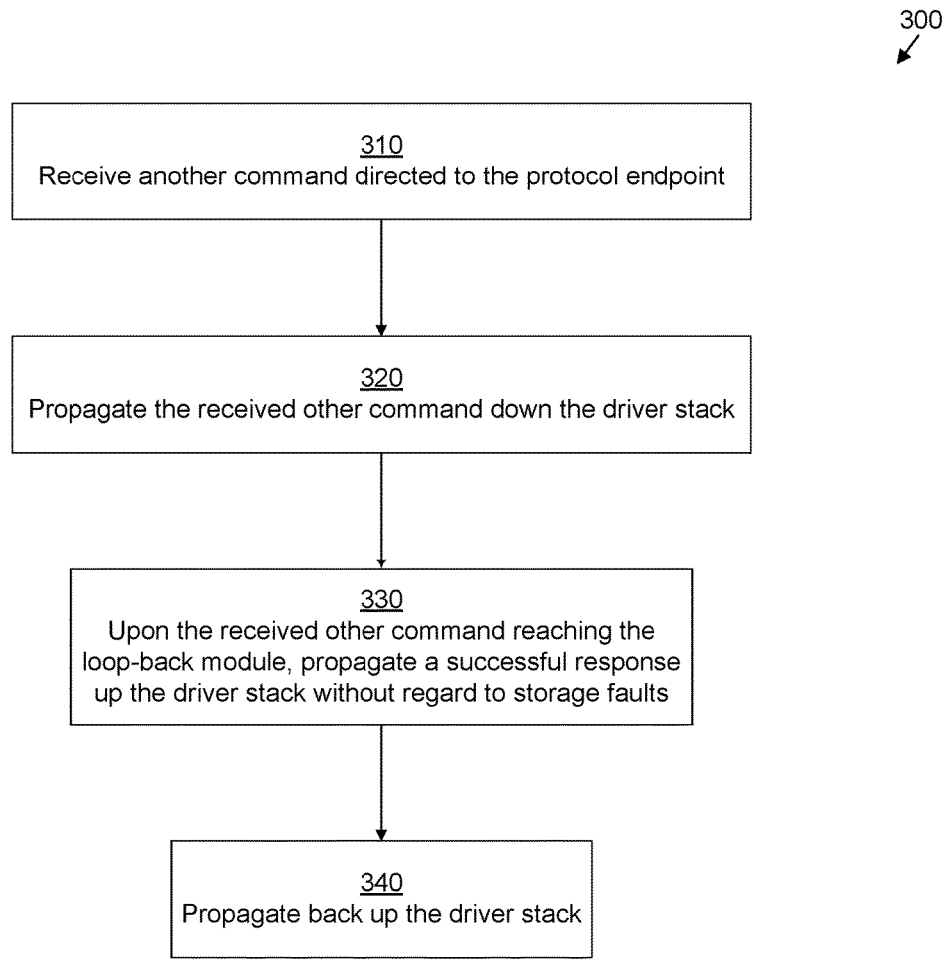
FIG. 5 is a flowchart depicting an example method for use in conjunction with various embodiments.

FIG. 5 depicts a method 300, performed by an SP 44 (e.g., SP 44(A)) for fulfilling another command (e.g., a SCSI command) directed at a PE LUN 50. Thus, method 300 occurs after method 100 (or at least after steps 110 and 120) has been performed. Method 300 may also be performed after method 200.

In step 310, TLD 72 receives another command (e.g., a SCSI command) directed to a PE. TLD 72 may make reference to the target address of this command to determine whether it is addressed to an HLU 48, VLU 54, or PE LUN 50.

In step 320, TLD 72 sends the received command down the shortened driver stack 59 for the appropriate LUN object 48, 50, 54. Thus, if the command is directed at PE LUN 50(a), TLD 72 forwards the command to the redirector driver 74 operating on intermediate PE LUN 78(a). In some cases, TLD 72 will first make management changes to the PE at the top level. Once the command reaches the redirector driver 74, redirector driver 74 may mirror any changes made onto the peer SP 44(B).

In step 330, upon the received command reaching the loop-back module 79, success is returned by the loop-back module 79. This is done regardless of any faults of any RAID groups 62.

Then, in step 340, the redirector driver 74 is able to send a successful response (unless the command failed at the TLD 72 or redirector driver 74 level) up the driver stack without regard to storage faults.

Thus, techniques for implementing the PE as a logical volume (PE LUN 50) having no underlying storage have been presented. Since the PE LUN 50 has no underlying storage, a faulted RAID group 62 cannot fault the PE. In addition, since the PE LUN 50 is still implemented as a logical volume, it can utilize features from within the storage driver stack 59 (e.g., redirector driver 74). However, since a logical volume cannot normally have zero underlying storage, the driver stack 59 is cut short prior to the lowest levels, so the drivers that deal with the underlying storage (e.g., low-level storage driver 80) are never accessed, instead being emulated by a loop-back mechanism 79.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed.

Another embodiment includes a computer that is programmed to perform one or more of the methods described in various embodiments.

It should be understood that all embodiments that have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A computer-implemented method performed by a computing device, the method comprising:
   receiving a setup command directing the computing device to create a protocol endpoint on the computing device to allow a remote host device to access storage volumes of the computing device presented to the remote host through the protocol endpoint as virtual storage volumes; in response to receiving the setup command, creating a logical storage device object representing the protocol endpoint, the logical storage device object having zero underlying storage capacity;
   subsequent to creating the logical storage device object, receiving a command directed at the protocol endpoint; and
   in response to receiving the command, processing the command by a driver stack on the computing device containing the logical storage device object representing the protocol endpoint, the driver stack being shorter than another driver stack on the computing device used to process storage commands directed at another logical storage device object having non-zero underlying storage.

2. The method of claim 1 wherein the driver stack includes:
   a top level driver configured to present logical storage devices to the remote host;
   a redirector driver below the top level driver, the redirector driver configured to redirect storage commands between a first storage processor of the computing device and a second storage processor of the computing device; and
   a loop-back module configured to emulate the existence of a low-level storage driver that controls access to storage of the computing device without performing the functionality of the low-level storage driver.

3. The method of claim 2 wherein the other driver stack includes:
   the top level driver;
   the redirector driver below the top level driver; and
   the low-level storage driver below the redirector driver.

4. The method of claim 3 wherein:
   the command is a bind command from the remote host device directing the protocol endpoint to present a new virtual storage volume to the remote host; and
   processing the command by the driver stack includes:
      creating a new logical storage device object having non-zero underlying storage, the new logical storage device object being managed by the other driver stack, the low-level storage driver of the other storage stack mapping the new logical storage device object to a RAID group of the computing device; and
      presenting, by the top level driver of the driver stack, the new logical storage device object to the remote host through the protocol endpoint as the new virtual storage volume.

5. The method of claim 4 wherein the method further comprises:
   receiving a storage command directed to the new virtual storage volume;
   propagating the received storage command down the other driver stack for fulfillment by the low-level storage driver of the other storage stack;
   upon the received storage command reaching the low-level storage driver, determining that the RAID group of the computing device is faulted; and
   in response to determining that the RAID group of the computing device is faulted, propagating a failure response up the other driver stack.

6. The method of claim 5 wherein the method further comprises:
   receiving another command directed to the protocol endpoint;
   propagating the received other command down the driver stack; and
   upon the received other command reaching the loop-back module, propagating a successful response up the driver stack although the RAID group of the computing device remains faulted.

7. The method of claim 1 wherein:
   the command is a command from the remote host device directing the protocol endpoint to report on the virtual storage volumes it is presenting to the remote host; and
   processing the command by the driver stack includes returning identification information regarding each virtual storage volume that the protocol endpoint is configured to present to the remote host.

8. An apparatus comprising:
   network interface circuitry for communicating with a remote host over a network connection;
   I/O circuitry for communicating with persistent storage; and
      processing circuitry coupled to memory configured to perform the following operations:
      receiving a setup command directing the apparatus to create a protocol endpoint to allow the remote host device to access storage volumes of the apparatus presented to the remote host through the protocol endpoint as virtual storage volumes;
      in response to receiving the setup command, creating a logical storage device object representing the protocol endpoint, the logical storage device object having zero underlying storage capacity;
      subsequent to creating the logical storage device object, receiving a command directed at the protocol endpoint; and
      in response to receiving the command, processing the command by a driver stack running on the processing circuitry containing the logical storage device object representing the protocol endpoint, the driver stack being shorter than another driver stack running on the processing circuitry used to process storage commands directed at another logical storage device object having non-zero underlying storage.

9. The apparatus of claim 8 wherein:
   the processing circuitry coupled to memory is mounted on a first storage processor board of the apparatus;
   the apparatus further comprises;

a second storage processor board having additional processing circuitry coupled to memory; and an inter-processor interconnect communicatively connecting the first storage processor and the second storage processor; and the driver stack includes:

a top level driver running on the processing circuitry configured to present logical storage devices to the remote host;

a redirector driver running on the processing circuitry below the top level driver, the redirector driver configured to redirect storage commands between the first storage processor and the second storage processor across the inter-processor interconnect; and a loop-back module running on the processing circuitry configured to emulate the existence of a low-level storage driver that controls access to the persistent storage via the I/O circuitry without performing the functionality of the low-level storage driver.

10. The apparatus of claim 9 wherein the other driver stack includes:

the top level driver;

the redirector driver below the top level driver; and the low-level storage driver below the redirector driver.

11. The apparatus of claim 10 wherein:

the command is a bind command from the remote host device directing the protocol endpoint to present a new virtual storage volume to the remote host; and processing the command by the driver stack includes:

creating a new logical storage device object having non-zero underlying storage, the new logical storage device object being managed by the other driver stack, the low-level storage driver of the other storage stack mapping the new logical storage device object to a RAID group of the persistent storage; and presenting, by the top level driver of the driver stack, the new logical storage device object to the remote host through the protocol endpoint as the new virtual storage volume.

12. The apparatus of claim 11 wherein the processing circuitry coupled to memory is further configured to perform the following operations:

receiving a storage command directed to the new virtual storage volume;

propagating the received storage command down the other driver stack for fulfillment by the low-level storage driver of the other storage stack;

upon the received storage command reaching the low-level storage driver, determining that the RAID group of the persistent storage is faulted; and in response to determining that the RAID group is faulted, propagating a failure response up the other driver stack.

13. The apparatus of claim 12 wherein the processing circuitry coupled to memory is further configured to perform the following operations:

receiving another command directed to the protocol endpoint;

propagating the received other command down the driver stack; and upon the received other command reaching the loop-back module, propagating a successful response up the driver stack although the RAID group remains faulted.

14. The apparatus of claim 8 wherein:

the command is a command from the remote host device directing the protocol endpoint to report on the virtual storage volumes it is presenting to the remote host; and processing the command by the driver stack includes returning identification information regarding each virtual storage volume that the protocol endpoint is configured to present to the remote host.

15. A computer program product comprising a non-transitory computer-readable storage medium storing a set of instructions, which, when executed by the computing device, cause the computing device to perform the following operations:

receiving a setup command directing the computing device to create a protocol endpoint on the computing device to allow a remote host device to access storage volumes of the computing device presented to the remote host through the protocol endpoint as virtual storage volumes;

in response to receiving the setup command, creating a logical storage device object representing the protocol endpoint, the logical storage device object having zero underlying storage capacity;

subsequent to creating the logical storage device object, receiving a command directed at the protocol endpoint; and in response to receiving the management command, processing the command by a driver stack on the computing device containing the logical storage device object representing the protocol endpoint, the driver stack being shorter than another driver stack on the computing device used to process storage commands directed at another logical storage device objects having non-zero underlying storage.

16. The method of claim 2 wherein the loop-back module is further configured to always return a successful response up to the redirector driver.

* * * * *